United States Patent [19]

Michelin

[11] 3,725,605

[45] Apr. 3, 1973

[54] WIDE WEB RECORDER WITH INCREMENTAL TAPE TRANSPORT AND MULTIPLE TRANSVERSALLY SCANNING HEADS

[76] Inventor: Marcel M. E. Michelin, Apartado No. 5, Alhaurin el Grande, Malaga, Spain

[22] Filed: Aug. 7, 1970

[21] Appl. No.: 62,085

[52] U.S. Cl. ........................179/100.2 T, 179/100.2 MD, 179/100.2 CA, 274/4 J

[51] Int. Cl. ..........................G11b 5/48, G11b 21/04

[58] Field of Search .............179/100.2 T, 100.2 MD; 274/4 J

[56] References Cited

UNITED STATES PATENTS

| | | | |
|---|---|---|---|
| 3,549,822 | 12/1970 | Chupity | 179/100.2 T |
| 3,332,085 | 7/1967 | Gray | 179/100.2 MD |
| 2,657,062 | 10/1953 | Meunier | 179/100.2 T |
| 3,559,999 | 2/1971 | Perkins | 274/4 J |
| 3,124,360 | 3/1964 | Staar | 274/4 J |
| 2,648,589 | 8/1953 | Hickman | 179/100.2 T |
| 2,326,332 | 8/1943 | Clausen | 179/100.2 T |

*Primary Examiner*—Bernard Konick
*Assistant Examiner*—Robert S. Tupper
*Attorney*—Cecil L. Wood and Peter J. Murphy

[57] ABSTRACT

Apparatus for recording or playing back information magnetically recorded on a tape or web having a recording width of five inches or more for the purpose of handling recordings of long duration, such as books. The apparatus includes means for intermittent incremental advance of the web from the feed spool to the take-up spool, and means for producing traversal of the record-playback heads transversely across the web relative to adjacent, parallel, transverse tracks on the web. In one form, a head reciprocates back and forth to produce one or more tracks between each incremental web advance. In another form, heads carried on a rotor produce two or more adjacent tracks in the same direction between each incremental advance of the web. The apparatus includes means for rapid advance and rewind of the web.

16 Claims, 32 Drawing Figures

INVENTOR
Marcel M. E. Michelin
BY
Cecil P. Wood
ATTORNEY

PATENTED APR 3 1973 3,725,605

SHEET 02 OF 10

INVENTOR
Marcel M. E. Michelin
BY Cecil L. Wood
ATTORNEY

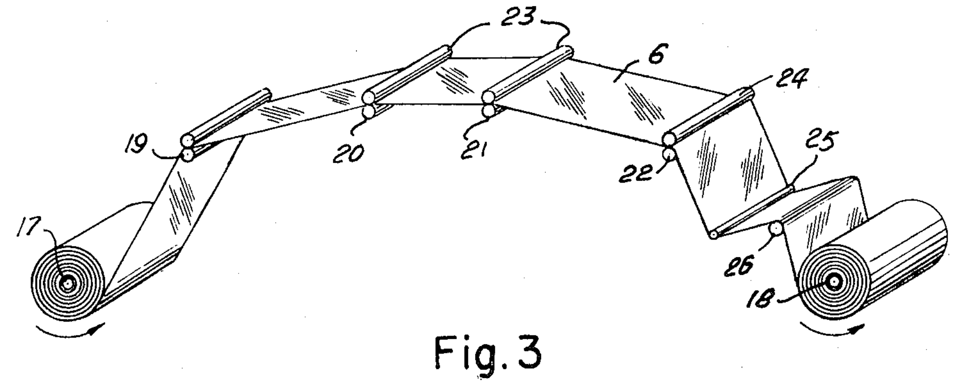
Fig. 3
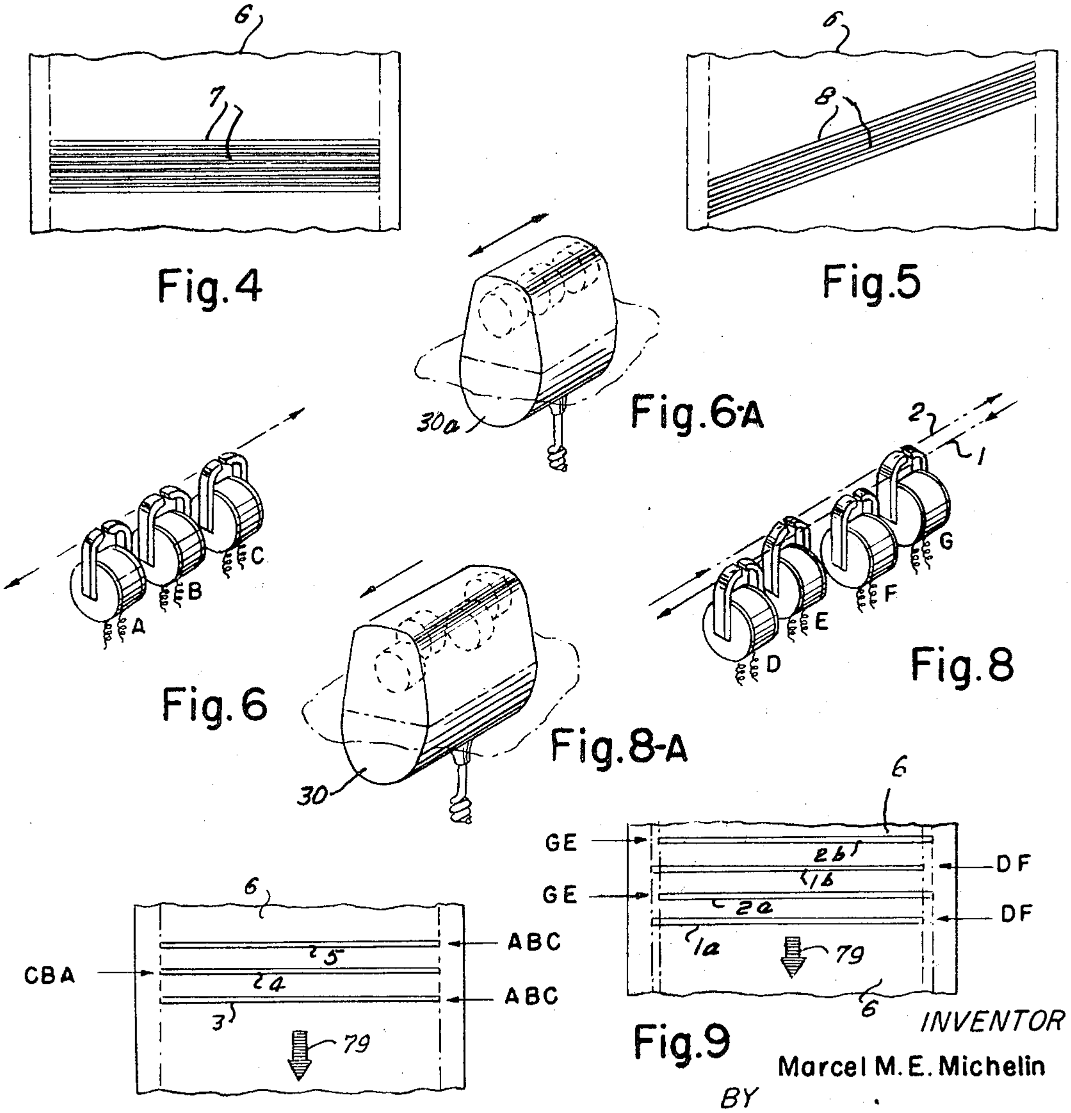
Fig. 4, Fig. 5, Fig. 6, Fig. 6-A, Fig. 8, Fig. 8-A, Fig. 9, Fig. 7
INVENTOR
Marcel M. E. Michelin
BY
Cecil L. Wood
ATTORNEY INVENTOR
Marcel M. E. Michelin
BY
Cecil L. Wood
ATTORNEY INVENTOR
Marcel M. E. Michelin
BY
Cecil L. Wood
ATTORNEY INVENTOR
Marcel M.E. Michelin
BY
Cecil L. Wood
ATTORNEY INVENTOR
Marcel M. E. Michelin
BY Cecil L. Wood
ATTORNEY

PATENTED APR 3 1973

3,725,605

INVENTOR

Marcel M. E. Michelin

BY [signature]

ATTORNEY

INVENTOR
Marcel M. E. Michelin
BY Cecil L. Wood
ATTORNEY

INVENTOR
Marcel M.E. Michelin
BY Cecil L. Wood
ATTORNEY

WIDE WEB RECORDER WITH INCREMENTAL TAPE TRANSPORT AND MULTIPLE TRANSVERSALLY SCANNING HEADS

BACKGROUND AND SUMMARY OF THE INVENTION

This invention relates to magnetic recording and reproducing apparatus, and particularly to such apparatus for accommodating an extremely lengthy recording on a single reel.

A primary object of this invention is to provide the apparatus for accommodating, on a single reel of a recording tape or web, a recording of long duration up to twenty-four hours, for example.

Another object of this invention is to provide magnetic recording and reproducing apparatus accommodating an extremely wide web of magnetic material and producing transverse tracks of recorded information on said web.

A further object of this invention is to provide a magnetic recording and reproducing apparatus capable of accommodating lengthy recordings such as that of a book and yet being conveniently compact in size.

Still another object of this invention is to provide a magnetic reproducing apparatus which is capable of providing uninterrupted performance of a book, play, lecture or other lengthy audible presentation.

Broadly, apparatus according to the invention for accomplishing these objects includes means supporting a lengthy web for longitudinal advance in a path for engagement of one surface by a transversely moving recorder head. One or more heads are carried by support means to produce or detect one or more adjacent tracks on the web while stationary in the apparatus. Means is provide for advancing the web an incremental distance following the recording or detecting of each group of tracks, the distance corresponding to the width of the track group. The head support means may be reciprocating carriage or a rotor carrying a plurality of heads.

The novel features and the advantages of the invention, as well as additional objects thereon, will be understood more fully from the following description when read in connection with the accompanying drawings.

DRAWINGS

FIG. 3 is a diagrammatic illustration of the path of the magnetic web through the apparatus;

FIGS. 4 and 5 are diagrammatic illustrations of arrangements of recorded tracks on a web;

FIGS. 6 and 6A are respective diagrammatic and perspective illustrations of one form of record-playback head for use in the apparatus;

FIG. 7 is a diagrammatic illustration of tracks recorded by the head of FIGS. 6 and 6A;

FIGS. 8 and 8A are respective diagrammatic and perspective illustrations of another form of record-playback head for use with the apparatus of the invention;

FIG. 9 is a diagrammatic illustration of tracks recorded by the head of FIGS. 8 and 8A;

DESCRIPTION OF THE PREFERRED EMBODIMENTS

Figure 1:
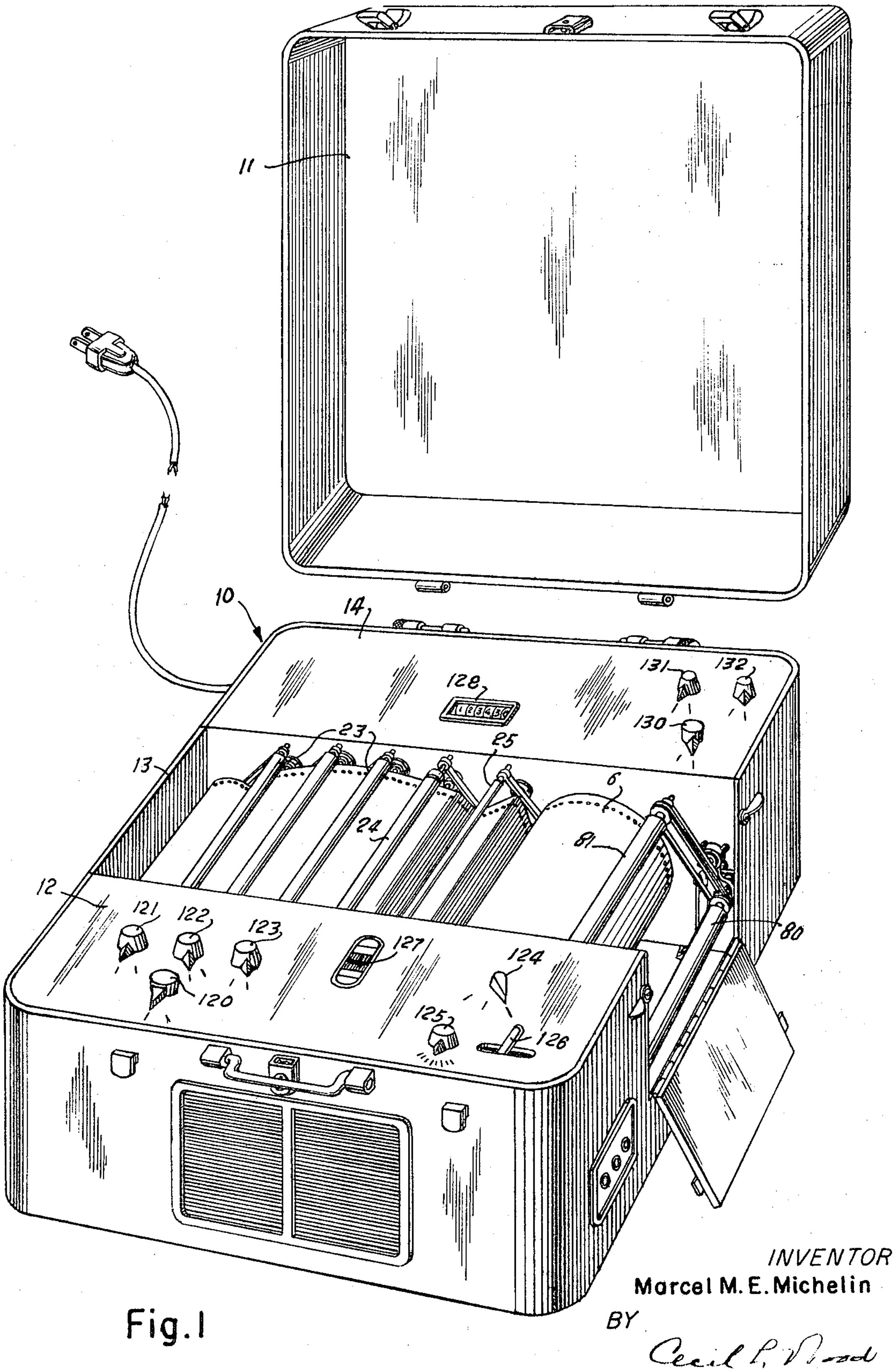
FIG. 1 is a perspective view of the overall apparatus according to one embodiment of the invention as contained in a suitable carrying case.

In the following description, two overall forms of apparatus according to the invention will be described. In both forms, the apparatus is designed to accommodate a web or tape having a recording area, apart from marginal areas, of a substantial width such as 126 mm. (about 5 inches) or more. The magnetic track recorded on the web has a width of something less of 3 mm., which is conventional in tape recording apparatus; and these tracks are produced on the web transversely as illustrated in FIGS. 4 and 5. In FIG. 4, the tracks 7 are disposed perpendicular to the length or direction of movement of the web 6; and the apparatus will be designed to produce an incremental advance of 3 mm. for each track 7 to be recorded or reproduced. In FIG. 5, the tracks 8 are disposed at an angle relative to the length or direction of movement of the web 6; and with this arrangement the transverse tracks would be somewhat longer relative to each incremental advance of the web. Again, the width of each track would be about 3 mm. and the incremental advance for the web would be adjusted accordingly, relative to the angle of the tracks 8.

In both forms of the invention to be described, the web 6 is advanced intermittently, a preselected incremental distance to record one, two or more magnetic tracks while the web is stationary. In the embodiment particularly illustrated in FIGS. 1 through 22, a record-playback head is reciprocated across the web to produce or detect the magnetic tracks; while in the form illustrated particularly in FIGS. 23–30 record-playback heads are carried on a rotor which rotates continuously to sweep the heads across the appropriately curved web 6. The described mechanism for incremental advance of the web is the same for both forms of the invention.

DESCRIPTION OF THE RECIPROCATING HEAD EMBODIMENT

Referring to FIG. 1 of the drawing, the recording apparatus may be conveniently contained in a flat rectangular case 10 having a suitable removable cover 11. The case illustrated in FIG. 1 is viewed from the front thereof and is divided into three sections including a front component section 12, a central web supporting and drive section 13 and a rear component section 14.

A web 6 for use in the apparatus is fabricated of any suitable material for electronic recording, particularly magnetic recording, and is preferably resistent to tear, roughing and crumpling without sacrificing the desired flexibility. Since the primary purpose of the apparatus is to have the capability of recording very lengthy material such as books and still retain a convenient size for portability, the web 6 is considerably wider than tapes conventionally used for magnetic recording and may have a width of 126 mm. (about 5 inches) or more. Preferably both edges of the web 6 are provided with longitudinally spaced perforations, for driving the web as will be described, and leaving a small margin for markings.

Referring particularly to the diagrammatic illustration of FIG. 3, the web 6 is supported between a feed or shaft spool 17, shown at the left in FIGS. 1 and 3, and a take-up spool or shaft 18, shown at the right in these figures. A "table area" within the web supporting section 13, is defined by tension rollers 19, 20 and 21 and drive roller 22 over which the web passes successfully as it advances from the feed spool to the take-up spool. Each of the tension rollers 19, 20 and 21 includes a mating pressure roller 23, the pressure rollers being disposed to bear on the upper surface of the web and being resiliently urged toward the respective tension rollers as will be described subsequently. The drive roller 22 also includes a mating pressure roller 24 which will be described subsequently.

Between the drive roller 22 and the take-up spool 18, there is provided a loop forming roller 25 acting in cooperation with an idler roller 26 to form a safety loop in the web as will be described subsequently.

Figure 10:
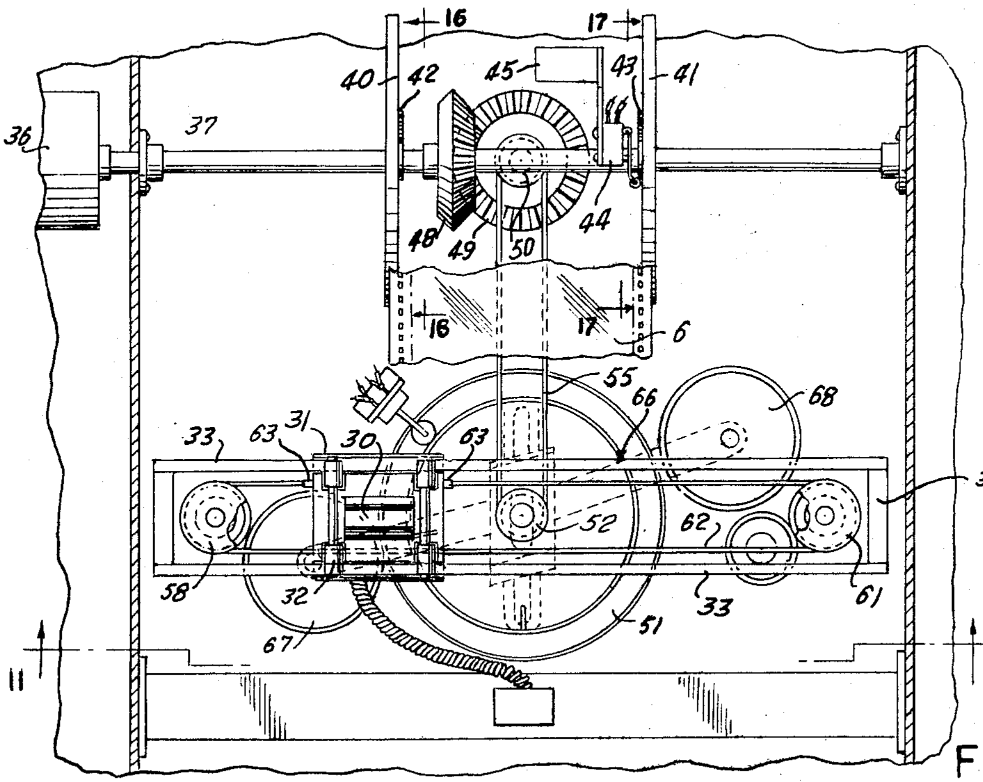
FIG. 10 is a fragmentary plan view of the apparatus illustrating the mechanism for advancing the web and/or reciprocating the record-playback head.
Figures 11, 12:
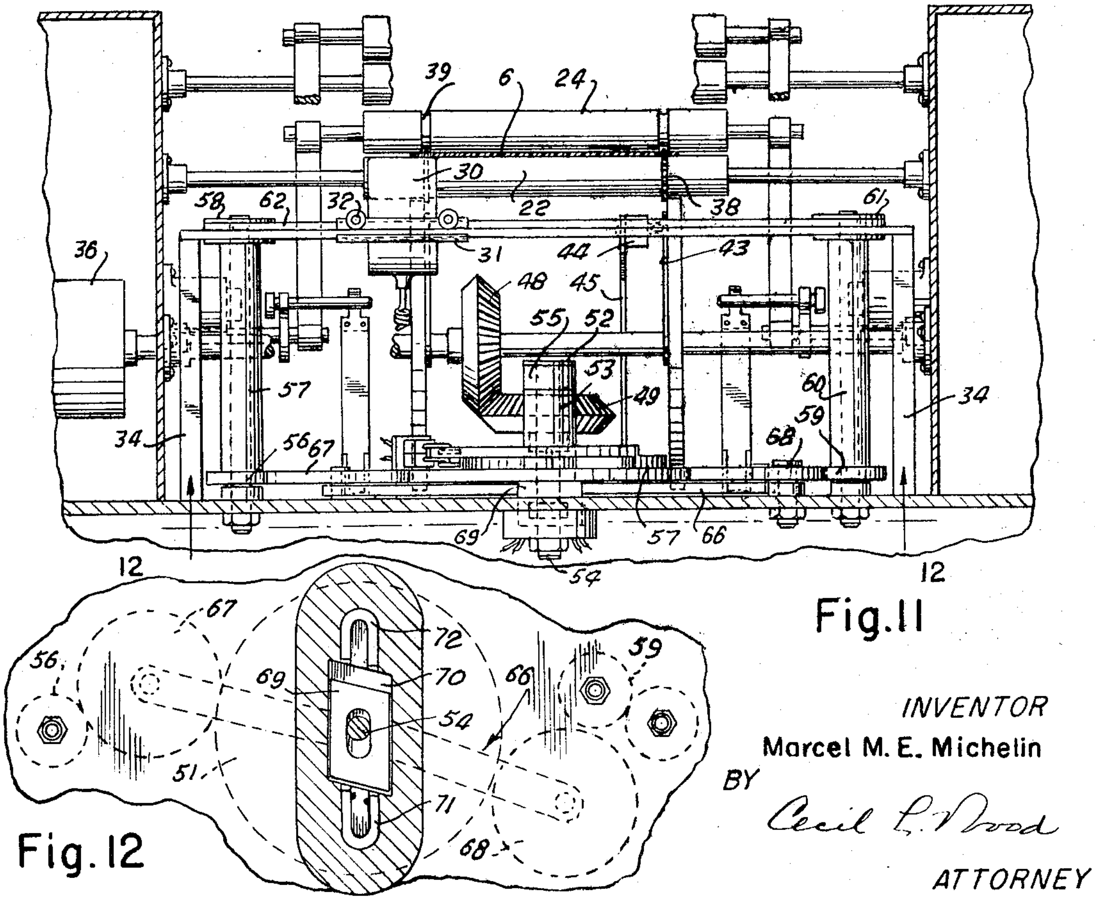
FIG. 11 is another fragmentary view of the apparatus illustrating the mechanism of FIG. 10, as viewed along the line 11—11 of FIG. 10.
FIG. 12 is a fragmentary detailed view of a portion of the head traversing mechanism as viewed along the line 12—12 of FIG. 11.

The web is horizontally supported relative to the case 10 between the tension rollers 20 and 21; and this area is the record-playback area. A recorder head 30 contains a plurality of electromagnets, as will be described, for the purpose of magnetically detecting, recording or erasing information in a well-known manner. As best seen in FIGS. 10 and 11, the recorder head is mounted in a carriage 31 including rollers 32 guided in the suitable transverse guide tracks 33 supported under the record-playback area whereby the recorder head traverses the path of the web 16 in the manner to engage the underside of the web. The guide tracks 33 are perpendicular to the web path to produce recorded tracks 7 as seen in FIG. 4.

Figure 15:
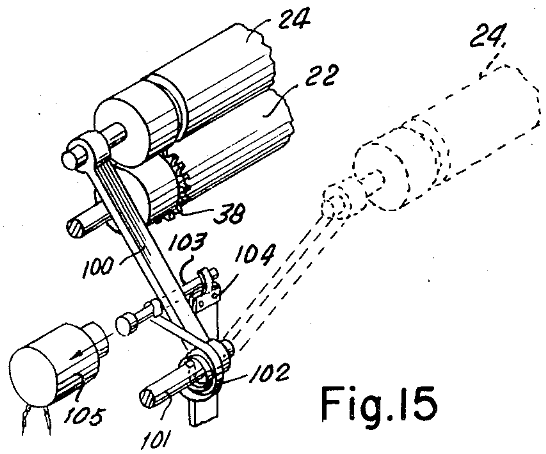
FIGS. 15, 16 and 17 are diagrammatic views illustrating the web incremental advance mechanism.
Figures 16, 19:
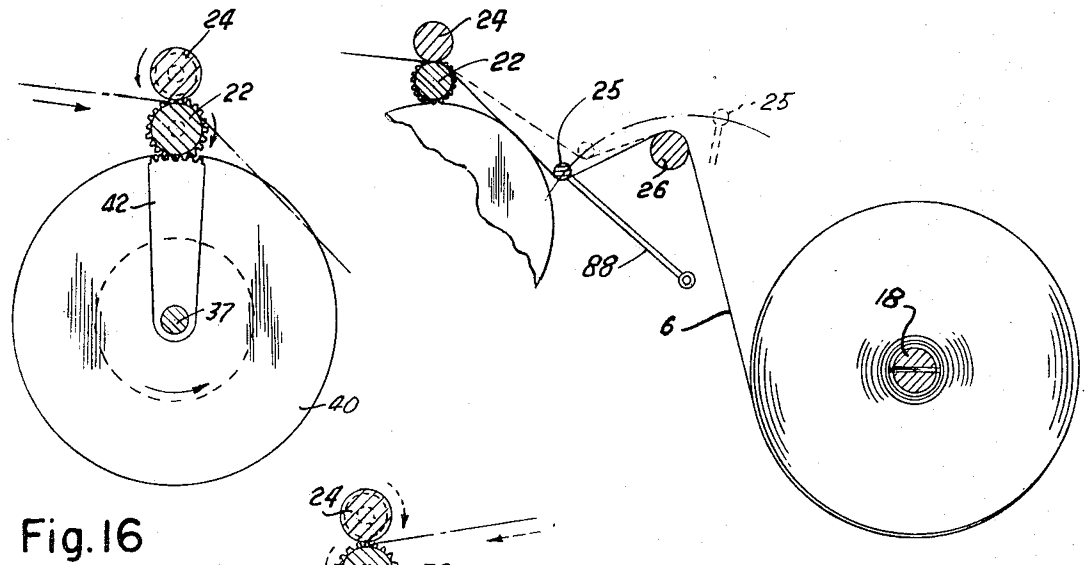
Figure 17:
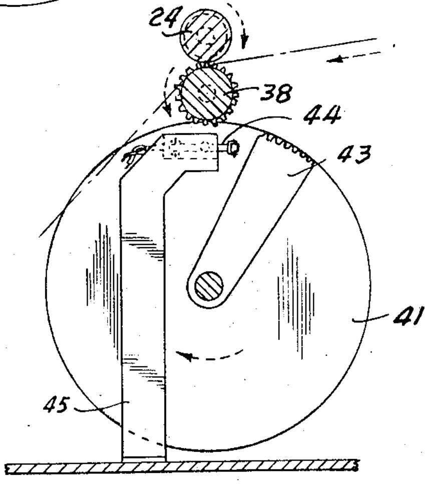
Figures 20, 21, 22:
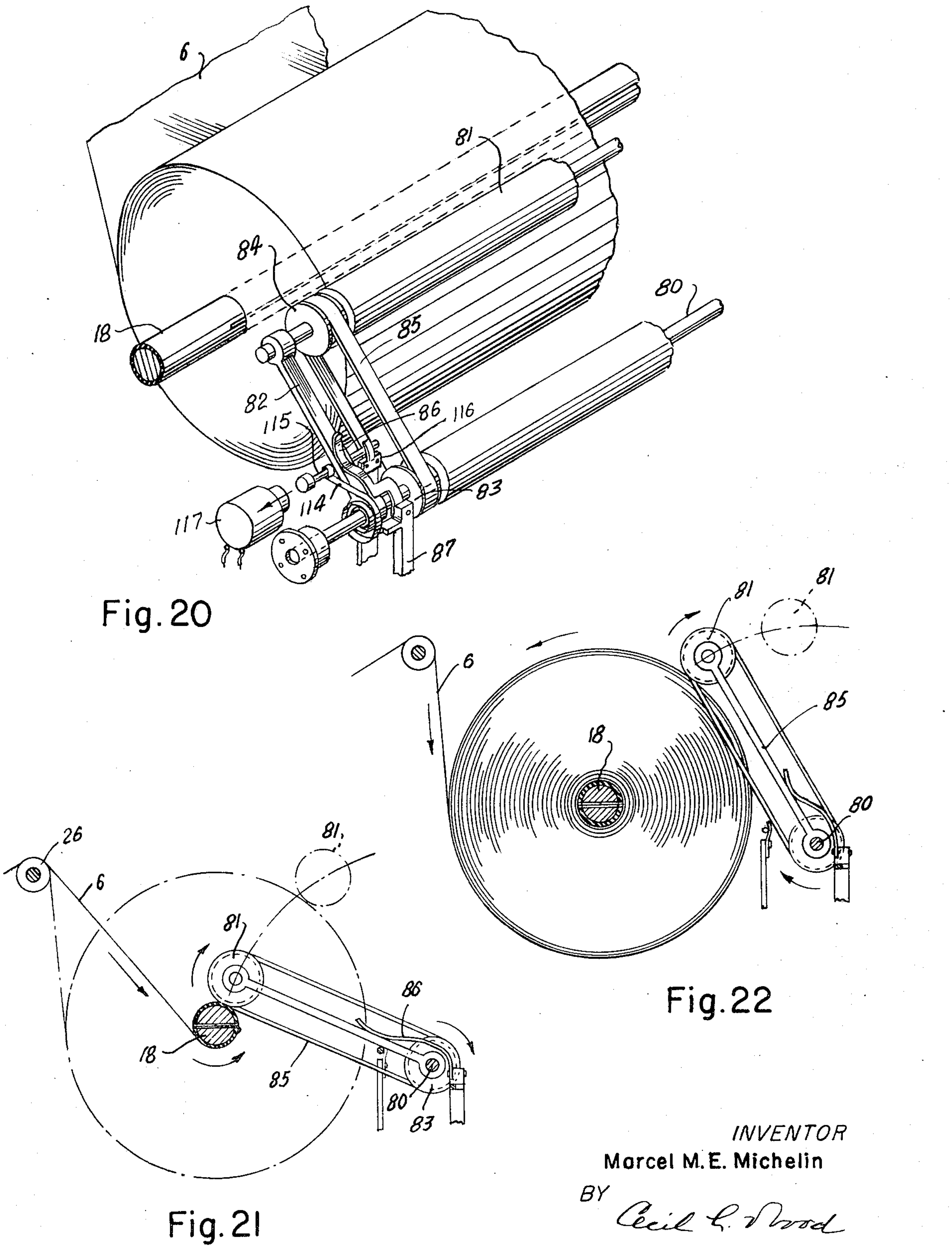
FIGS. 20, 21 and 22 are diagrammatic illustrations of the web take-up mechanism associated with the take-up spool.

A common power drive mechanism which provides for incremental advance of the web 16 and for the traversals of the recorder head 30 will now be described with particular reference to FIGS. 10, 11 and 12. The common power source for this mechanism is an electric drive motor 36 which drives a drive shaft 37 extending tranversely of the web supporting section 13 and rotatably supported in the side walls thereof. The drive shaft 37 is disposed vertically below the web drive roller 22. As seen in FIGS. 15 through 17, as well as FIG. 11, the web drive roller includes a pair of drive sprockets or pinions 38 which are positioned adjacent to the ends of the roller and spaced for engagement with the drive perforations provided at the opposite edges of the web 16. As best seen in FIG. 15, the sprocket teeth extend beyond the cylindrical surface of the main roller body 22; and the pressure roller 24 which maintains the web into engagement with the drive roller 22 is provided with mating annular grooves 39 to accommodate the sprocket teeth 38 permitting the cylindrical surfaces of the rollers 22 and 24 to engage the web simultaneously.

A pair of rotor discs 40 and 41 are nonrotatably mounted in axially spaced relation on the drive shaft 37 and carry respective gear segments 42 and 43 for intermittent engagement with the drive sprockets 37 of the drive roller 22. For each revolution of the rotor discs then, the gear segments engage the drive sprockets to produce a predetermined partial revolution of the drive roller 22 and therefore advance the web 6 a predetermined distance as will be explained more fully in connection with the operation of the apparatus.

As best seen in FIGS. 10 and 17 a switch 44 carried on a suitable bracket 45 secured to the case 10 carries a roller on an actuator arm which is positioned to be engaged by the gear segment 43 whereby the switch 44 is closed momentarily during the passage of the gear segment for a purpose to be described subsequently.

For traversing the recorder head carriage 31, the drive mechanism includes a bevel gear 48 nonrotatably fixed to the drive shaft 37 and an integral bevel gear pulley assembly consisting of a bevel gear 49 and a pulley 50. The bevel gear pulley assembly 49, 50 is rotatably supported on a shaft extending vertically upward from the base of the case 10, in position to be driven by the bevel gear 48.

A drive wheel assembly consisting of a drive wheel 51, pulley 52 and intervening sleeve 53 is rotatably supported on a vertical shaft 54 extending upwardly from the base of the case 10, and spaced from the bevel gear pulley assembly 49, 50 in a direction along the path of the web 11 toward the feed spool 17. The pulley 52 is horizontally aligned with the pulley 50; and these pulleys are coupled by a drive belt 55. The pulleys 50 and 52 and the drive belt 55 are preferably provided with coacting teeth to provide for positive drive to provide the desired syncronism between the web advancing drive and the head traversing drive. Alternatively, the pulleys and belt may be replaced by a sprocket and chain drive.

Laterally spaced from the drive wheel pulley assembly 51, 52, and on opposite sides thereof relative to the direction of web travel, are a first driven wheel pulley assembly consisting of a driven wheel 56, pulley 57, and intervening sleeve 58 and a second driven wheel pulley assembly consisting of driven wheel 59, pulley 60 and intervening sleeve 61. These assemblies are integral rotating assemblies rotatably supported on vertical shafts extending upwardly from the base of the case 10. As best seen in FIG. 11, the driven wheels 56 and 59 are disposed in the plane of the drive wheel 51, adjacent to the base of the case 10; while the pulleys 57 and 60 are disposed in an elevated horizontal plane, which is the plane of the recorder head carriage 31. An idler wheel 59a is mounted in the plane of the wheels 59 and 51, for continuous driving engagement with the wheel 59. As best seen in FIG. 10, a drive belt 62, again preferably in the form of a positive drive type belt, is drivingly engaged around the pulleys 57 and 60, the belt being discontinuous and being attached to the carriage 31 by means of suitable attaching devices 63. The carriage 31 is traversed back and forth along the track 33 then through rotation of the pulleys 57 and 60 in opposite directions of rotation.

As best seen in FIGS. 10 and 12 the mechanism for effecting reverse drive of the driven wheel-pulley assemblies 56, 57 and 59, 60 consists of a bracket 66 mounted for limited rectilinear movement in a horizontal plane in the direction of web movement, and rotatably carrying idler wheels 67 and 68. The bracket 66 is disposed beneath the drive wheel 51, and includes a downwardly projecting boss 69 which is parallelogram in shape and which is received in a groove 70 also parallelogram in shape provided in the base of the case 10. The groove 70 is slightly elongated relative to the boss 69 to permit relative rectilinear movement.

As mentioned above, the axes of rotation of drive wheel 51 and the driven wheels 56 and 59 lie in a vertical plane transverse to the direction of movement of the web 6. The idler wheels 67 and 68 are carried on lateral arms of the bracket 66 in a manner that the axes of rotation of the idler wheels are on opposite sides of the above-mentioned axis plane; with the idler wheels being disposed in the same horizontal plane as the drive wheel and driven wheels. With this arrangement, the shifting of the bracket 66 in one direction engages the idler wheel 67 simultaneously with the drive wheel 51 and the driven wheel 56; while the shifting of the bracket in the opposite direction engages the idler wheel 68 simultaneously with the drive wheel 51 and the idler wheel 59a, while disengaging the idler wheel 67 from its respective wheels. Since the drive wheel 51 is continuously driven in one direction of rotation, the driven wheels 56 and 59 and their associated assemblies are alternatively rotated in opposite directions of rotation to effect the traversal of the recorder head carriage 31 back and forth beneath the web 6. All of the above discussed drive, driven, and idler wheels are preferably provided with rubber rims for good driving contact.

The shifting of the bracket 66 between its alternative positions is effected by a pair of electromagnets 71 and 72 which are disposed at opposite ends of the groove 70 to act magnetically on the bracket boss 69. Electromagnets 71 and 72 are selectively energized by respective switches 73 and 74 which are mounted on the case 10 to be actuated by cylindrical cams 75 and 76 mounted on the upper face of the drive wheel 51. As best seen in FIG. 11, the switches 73 and 74 are mounted one above the other and include arms directed radially inward relative to the drive wheel 51 and carrying rollers to be engaged by the cams. The cams 55 and 56 are in the form of semicircular axial flanges mounted on the upper face of the drive wheel 51, with the lower cam 56 mounted adjacent to the face of the drive wheel and having an angular extent of 180°, while the upper cam 55 is axially displaced upwardly from the cam 56 also having an angular extent of 180° which is complementary to the angular extent of the cam 56. The cams and switches are so disposed, then, that the switches are alternatively energized during succeeding half revolutions of the drive wheel 51.

With this described arrangement, the head carriage 31 will traverse the web path in one direction for each half revolution of the drive wheel 51; and accordingly the drive wheel 51, the idler wheels 67, 68 and 59a, the driven wheels 56 and 59 and the carriage drive pulleys 57 and 60 must be appropriately sized to produce the desired length of carriage traversal for each half revolution of the drive wheel. As mentioned above, the length of the carriage traversal, and accordingly the length of a recorded track on the web 16, may be 126 mm. for example. Similarly, the above-mentioned wheels, pulleys, and other elements of the drive mechanism must be sized in relation to the motor speed to reproduce the desired linear speed of the head carriage 31. For example, for recording or reproducing the spoken word from a magnetic tape, the usual linear speed of the head relative to the tape is 190 mm. per second.

In a preferred form of the device, the drive mechanism is designed to produce two transversals of the recording head 30 for each incremental advance of the web; and accordingly the recorder head is designed to either record or read two side-by-side tracks as it traverses the web first in one direction and then in the other direction while the web is stationary. Since the usual width of a magnetically recorded track is approximately 3 mm., the increment feed mechanism for the web is designed to produce an incremental advance of 6 mm. between each double traversal of the recorder head 30. To produce this incremental advance, the above-described gear segments 42 and 43 should be coupled to the drive wheel 51 in a manner to produce one revolution of the drive wheel for each corresponding revolution of the gear segments. In this manner, with the gear segments producing a 6 mm. advance of the web through the feed roller 22 for each revolution thereof, the drive wheel 51 will produce the double traversal of the recorder head 30.

Furthermore it is necessary that the drive wheel cams 55 and 56 be timed relative to the engagement of the gear segments with the drive wheel 22, so that the advance of the web will be effected at the beginning of a head traversal immediately following a change in direction of the head movement.

A recorder head 30 for use with the above-described advance and traverse mechanism is particularly illustrated in FIGS. 8 and 8A. FIG. 8 is a diagrammatic illustration of the four electromagnets D, E, F and G, which are appropriately supported within the head 30 as illustrated in FIG. 8A; and the arrows in these figures illustrate the directions of head movement.

FIG. 8 illustrates the cores for the several electromagnets which define the magnetizing gaps, with the gaps being defined at the upper surface of the head illustrated in FIG. 8A. As seen in FIG. 8, the gap defining cores for the electromagnets D and F are aligned in one path, identified as path or track 1 by the arrows directed to the left in FIG. 8. For the traversal of the head along path 1 the lead magnet D would function as an erase magnet while the trailing magnet F would function as the recording or reading magnet. Similarly, the gap defining cores for the magnets E and G are aligned in an adjacent path or track 2 identified by the arrows directed to the right in FIG. 8; and for the traversal of head in this direction, the lead magnet G functions as an erase magnet while the trailing magnet E functions as the record or read magnet.

Relating the directions of head traversals to the directions of web feed as indicated by the arrows 79 in FIGS. 8 and 9, FIG. 9 illustrates four successive tracks recorded on a web 6. While these tracks 1*a*, 1*b*, 2*a* and 2*b* are illustrated in spaced relation for purposes of clarity, in actuality they would be contiguous tracks 3 mm. wide according to the stated example.

Assuming a recording situation, immediately following one incremental advance of the web 6, the head 30 would make one traversal to the left wherein the head F would function to record the track 1*a* (or else the erase head D would erase previously recorded information). Upon reversal of the head, the magnet F (or D as the case may be) would be switched off while the recording magnet E would be switched on, whereby magnet E would effect the recording of track 2*a* during traversal to the right (or else, the erase magnet G being switched on, would be erasing any previously recorded information). Following a recording of 2*a*, the wide web would be advanced 6 mm. to position it for subsequent recording of the track 1*b* by the magnet F (or for erasing by d), and the track 2*b* for recording by the magnet E (or for erasing by G). In this manner successive adjacent tracks are recorded on the web.

For the "read" function, the erase magnets D and G would be de-energized while the magnets E and F functioning as read magnets would be alternately energized. For the "erase" function, which would only be used to erase a pre-recorded tape, the erase magnets D and G would be alternately energized in a running erasing operation, while the magnets E and F would be de-energized.

The switching of the magnets may be accomplished for example, through the same switches 73 and 74 which effect the reversal of the head traverse, or may be accomplished by other switching devices such as an electronic eye switching device actuated by the head carriage 31 at the limits of its movements. During the incremental advances of the web, it may be desirable that the magnets E and F whether functioning as recording magnets or as read magnets be switched off to eliminate unnecessary noise; and this might be readily accomplished through the switch 44 actuated by the gear segment 43 which is closed only during the interval of the incremental advance.

In an alternative form, the apparatus may be designed to record or read only a single track of information between each incremental advance of the web 6. FIGS. 6, 6A and 7 illustrate a recording head 30*a* designed for this form of operation, and the method of recording tracks on the web. The direction of incremental advance of the web relative to the head is again indicated by the arrows 79. For this alternative form, the head 30*a* includes three magnets A, B and C, aligned on a single track or path, with the inner magnet B functioning as the record or read magnet while the outer magnets A and C function as erase magnets. Referring to FIG. 7, successively produced tracks 3, 4, 5 and 6 are illustrated. Track 3 is produced by traversal to the left wherein the lead magnet A and last magnet C are de-activated, while the magnet B functions to record said track 3. For recording track 4 on a reverse traverse of the head 30A, the magnet B again functions to record track 4, while magnets A and C are de-activated. Tracks 5 and 6 are then recorded in the manner of tracks 3 and 4 respectively. In this alternative form, the relationships between the rotor discs 40 and 41 and the associated gear segments 42 and 43, relative to the drive wheel 51 must be changed to produce an incremental 3 mm. advance of the web between each traversal of the recorder head 30*a*.

Figure 2:
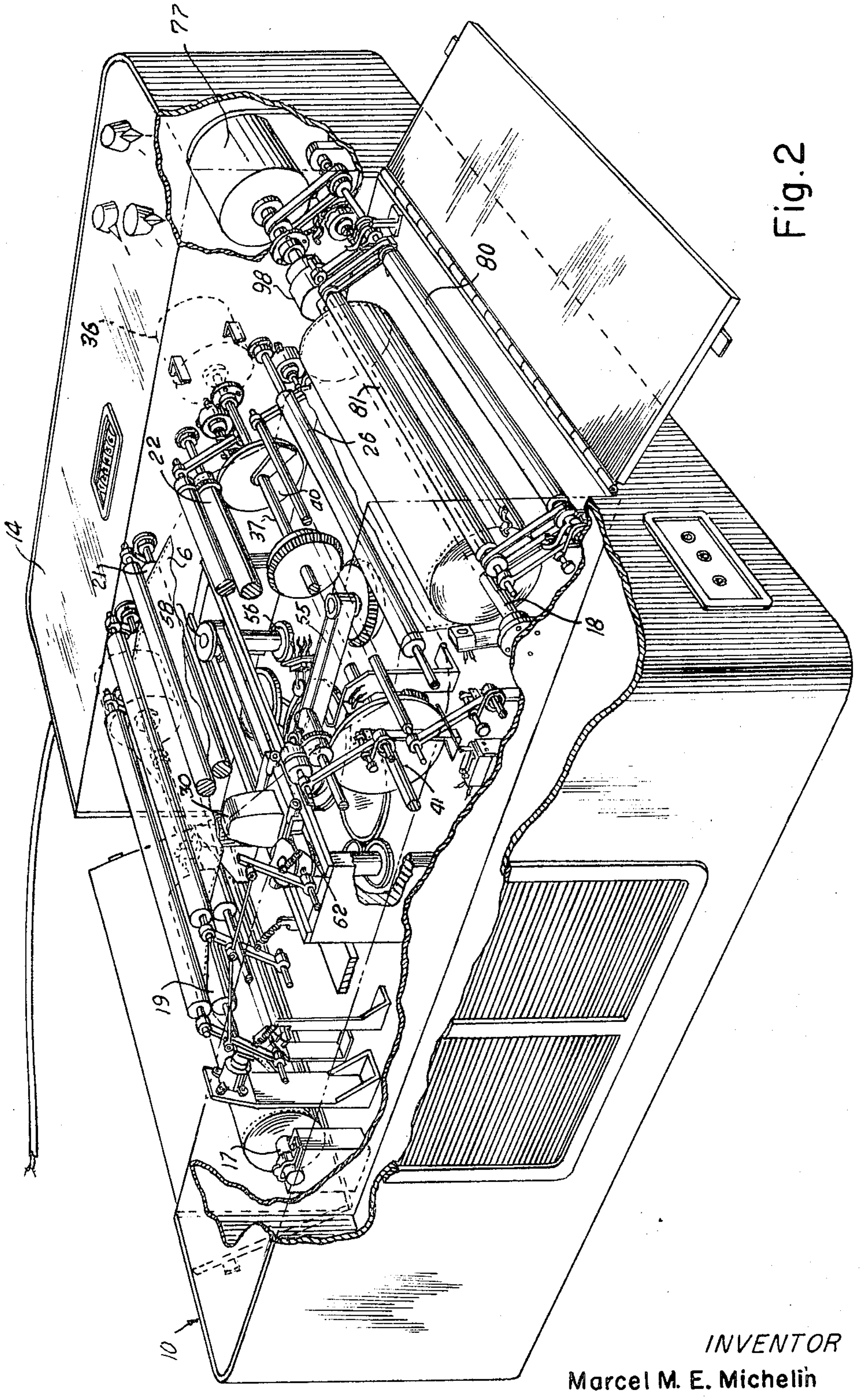
FIG. 2 is a perspective view of the apparatus of FIG. 1 with the case broken away to show the structure and arrangement of internal components.

During the operation of the apparatus in either the record, playback, or erase mode, while the web is being advanced incrementally through the take-up shaft or roller 22, the feed spool 18 must be operated to take up the web at a corresponding rate. The mechanism for accomplishing this is particularly illustrated in FIGS. 2, 20, 21 and 22. It includes a take-up drive shaft 80 rotatably supported on an axis parallel to the axis of the take-up spool 18. The shaft 80 may be driven by an advance motor 77 through a belt 78 and associated pulleys as seen in FIG. 2. A take-up roller 81 is rotatably supported in parallel relation to the drive shaft 80 by a pair of arms 82 (only one being shown in FIG. 20) with the arms 82 being pivotally supported on a drive shaft 80 whereby the take-up roller may be swung into or out of engagement with the surface of the web roll which is accumulated on the take-up spool 18, so that the feed roller 81 may adjust itself to the diameter of the web roller as it grows on the take-up spool during operation of the apparatus. The take-up roller is driven from the shaft 80 through pulleys 83 and 84 nonrotatably fixed to the shaft 80 and roller 81 respectively and associated belt 85. To maintain the feed roller 81 in engagement with the web roll, springs 86 supported on suitable brackets 87 bear against the arms 82 to continuously urge the feed roller 81 against the web roll.

Since the feed roller 81 operates on the outer periphery of the web roll, the rate of take-up of the web on the take-up spool 18 will be substantially uniform regardless of the diameter of the web roll which has accumulated. The rate of take-up then through the drive shaft 80 may be timed relative to the incremental feed through the feed roller 22 to provide a continuous take-up rate which corresponds to the incremental take-up rate over a period of time.

Figure 18:
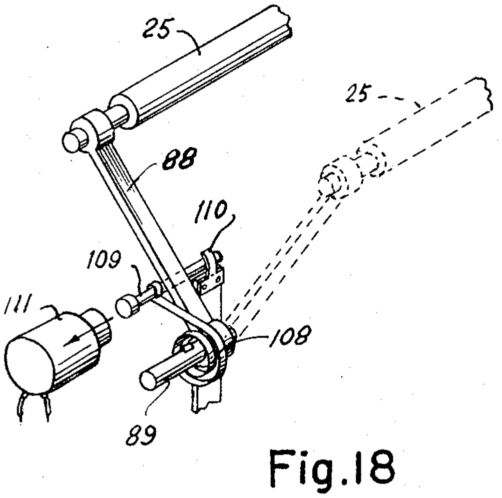
FIGS. 18 and 19 are diagrammatic views illustrating the web safety loop forming mechanism.

To compensate for a loss of timing between the incremental feed rate through the roller 22 and the continuous feed rate through the roller 81 a safety loop in the web is provided through the loop roller 25 particularly illustrated in FIGS. 18 and 19. As best seen in FIG. 18, the roller 25 is rotatably supported at the upper ends of a pair of transverse arms 88 (one being shown in FIG. 18) which are pivotally supported relative to the case 10 on pivot shafts 89 so that the roller 25 may be swung transversely relative to the path of the web to form a loop between the incremental feed roller 22 and the idler roller 26 as seen in FIGS. 3 and 19. The safety loop formed by the roller 25 will vary in depth during operation to compensate for the incremental feed provided by the feed roller 22 and the continuous feed at the take-up spool. Should the depth of the loop 25 decrease to a predetermined depth, where it tends to disappear due to a too fast rate of take-up at the spool 18, the roller arm 88 may engage a limit switch (not shown) for the purpose of either momentarily shutting off the drive motor 77 or otherwise stopping the take-up roll drive. With the take-up then stopped, the depth of the loop will increase resulting in dropping of the arm 88 and restarting of the roller drive motor. In this manner, damage to the web is obviated.

Figure 13:
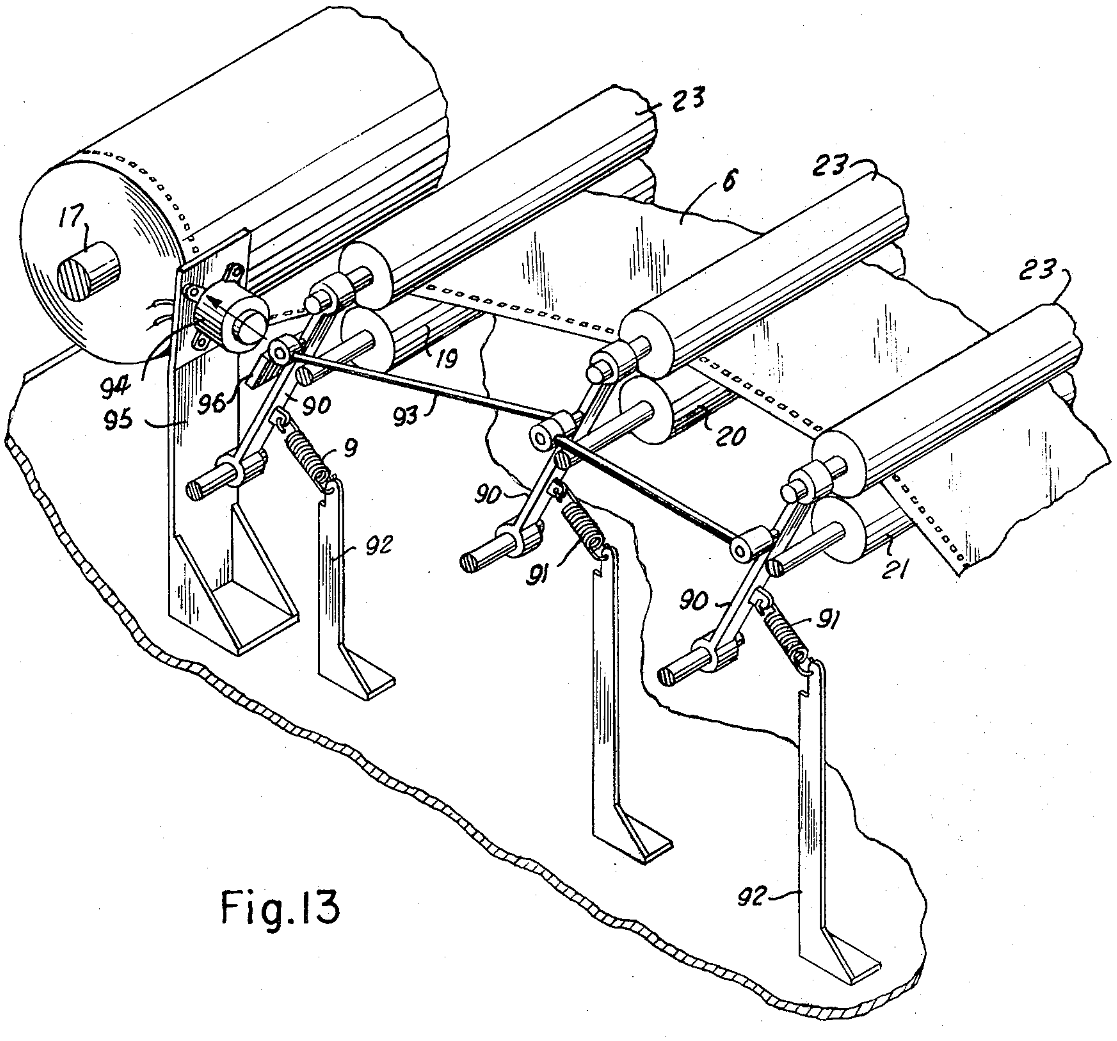
FIGS. 13 and 14 are fragmentary views illustrating the tension rollers associated with the web adjacent to the feed spool.

To further obviate damage to the web during the incremental advance of the web through the feed roller 22, the three pressure rollers 23 associated with the tension rollers 19, 20 and 21 are lifted off the respective tension rollers momentarily during each incremental advance. As best seen in FIG. 13, each of the pressure rollers 23 is supported at the upper end of a pair of arms 90, with the lower ends of the arms being pivotally supported on the case 10 whereby the rollers are swung into and out of engagement with the respective tension rollers. Each of the pressure rollers 23 is held into engagement with its associated tension roller through tension springs 91 connected between the respective arms 90 and fixed brackets 92. The arms 90 for the three pressure rollers 23 are linked together through pivotally mounted links 93 so that the arms are operated together.

Figure 14:
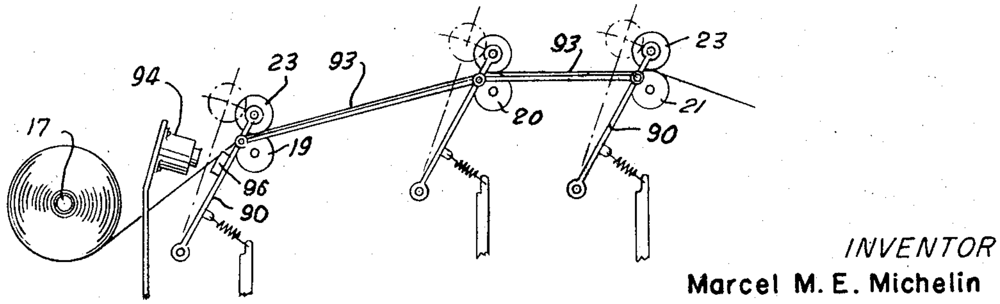

As best seen in FIGS. 13 and 14, an electromagnet 94 is mounted on an appropriate bracket 95 in position to act on an armature member 96 associated with the arm 90 for the pressure roller 23 nearest the feed spool 17. As seen in the diagrammatic illustration of FIG. 14, the pressure rollers 23 are shown in the full line position in normal engagement with the respective tension rollers. When the electromagnet 94 is energized, the armature member 96 is attracted to the magnet to rotate all of the arms 90 counterclockwise to disengage the pressure rollers from the web. This motion is in opposition to the forces of the springs 91; and as soon as the magnets 94 are de-energized the springs 91 return the rollers to the normal position. The switching function to energize the magnets 94 is readily accomplished by the switch 44 actuated by the gear segment 43 during the incremental web feed as best seen in FIG. 17.

For the operations of "rapid advance", which is the advance of a substantial length of web past the record-playback area, and "rewind", which is the rewinding of the web on the feed spool 17, the take-up spool 18 and the feed spool may be directly driven by respective separate motors, or may be driven by a common motor. In the event of a common drive motor for these operations, the spools 17 and 18 may be alternatively coupled to the motor through an appropriate clutch and transmission.

In the apparatus illustrated in FIG. 2, the take-up spool 18 is driven by the drive motor 77 through a selectively engageable clutch 98. Since the drive motor 77 also drives the take-up roller 81, the clutch 98 will only be engaged during the rapid advance function and will be disengaged at all other times. As indicated in FIG. 2, the feed spool 17 is directly driven by a separate rewind motor 99 coupled to the feed spool shaft.

For these operations of rapid advance and rewind, it is desirable that the movement of the web be substantially unimpeded between the feed and take-up spools. Accordingly, for these operations, the pressure rollers 23 are disengaged from the web in the manner already described; and this may be accomplished through energization of the electromagnets 94 through the control switches for the rapid advance or rewind modes as will be described in connection with the operation of the apparatus.

Similarly means are provided for lifting the pressure roller 24 from its operative engagement with the feed roller 22, for lifting the loop roller 25 from its operative loop forming position, and for lifting the take-up roller 81 from driving engagement with the web roll on the take-up spool 18.

The mechanism for lifting the incremental feed pressure roller 24 is best shown in the diagrammatic illustration of FIG. 15 which shows only one end of the feed roller assembly. It is to be understood that the pressure roller is supported at its opposite end by identical components. As seen in the drawings, the pressure roller 24 is rotatably supported at the upper end of a pair of arms 100, with the lower ends of the arms being pivotally supported relative to the casing 10 on appropriate pivot shafts 101. Spiral springs 102, disposed about the pivot shafts have inner end secured to the shafts and carry at their outer end latch pins 103 fabricated of magnetic material. The springs are coiled in a manner to urge the latch pins 103 against the arms 101 to rotate the arms in a clockwise direction as viewed in FIG. 15. Latch springs 104 are fixed relative to the case 10 to latch the latch pins 103 in the position shown in FIG. 15, wherein the pressure roller 24 maintains its normal position against the feed roller 22. To effect swinging of the pressure roller 24 away from the feed roller 22, electromagnets 105 are energized to effect lateral shifting of the magnetic latch pins 103 thereby releasing them from the latch springs 104. This permits the spiral springs 102 acting through the latch pins to rotate the arms 100 clockwise to the dotted line position in FIG. 15. To reset the pressure roller in the normal position, the latch pins are manually re-engaged with the lateral springs 104.

A similar latch and release mechanism for the loop roller 25 is illustrated in FIG. 18 which again shows only one end of the loop roller assembly. As seen in this figure, spiral springs 108 are mounted over the pivot shafts 89, and have their inner end fixed to the shafts with their outer ends carrying latch pins 109. With the springs coiled about the pivot shafts, the latch pins are latched under latch springs 110 mounted on suitable brackets fixed to the case 10. In the latched position, the latch pins 109 are maintained out of engagement with the arms 88; and the arms are permitted to oscillate with the changing depth of the web loop. When it is desired to disengage the loop roller 25 from the web, electromagnets 111 mounted on the case 10 are energized to laterally shift the latch pins out of engagement with the latch springs 110. This permits the spiral springs 108 acting through the latch pins to rotate the arms 88 and roller 25 clockwise as viewed in FIG. 18 to the dotted line position. This position is also indicated by the roller *25a* in FIG. 19, wherein it is apparent that the roller 25 is rotated out of the path of the web so that the loop formed in the web may disappear. To again effect operative engagement of the loop roller 25 with the web, the latch pins 109 may be manually latched under the latch springs 110.

A similar latch and release mechanism is provided for the take-up feed roller 81 associated with the take-up spool 18. This mechanism is particularly illustrated in FIG. 20, which again shown one end of the take-up roller assembly and includes spiral springs 114 disposed around the drive shaft 80 and having their inner ends nonrotatably fixed to the support bracket 87 in a manner to permit the necessary rotation of the drive shaft. The outer ends of the spiral springs carry latch pins 115 which are latched under the latch springs 116, mounted on the brackets 87, when the springs are coiled relative to the drive shaft. In this latched position, the latch pins 115 do not interfere with the oscillating movements of the arms 82 supporting the feed roller 81 as previously described. When it is desired to disengage the feed roller from the web roll, the latch pins 115 are disengaged from the latch springs 116 through energization of electromagnets 117; and the spiral springs 114 acting through the latch pins 115 engage the arms 82 to swing the feed roller assembly in a clockwise direction as viewed in FIGS. 20, 21 and 22 to the dotted line position of FIG. 22. For this swinging, the forces exerted by the spiral springs 114 overcome the forces exerted by the springs 86 which normally maintain the feed roller 81 in engagement with the web roll. To again effect take-up drive by the feed roller 81, the latch pins 115 are manually reengaged under the latch springs 116.

Referring to FIG. 1, there are shown by way of example several control devices for operating, and monitoring the operation of, the apparatus. While an overall operating circuit for the apparatus is not described, the operating functions of the several components which have been described, and the operating sequence which will be described in connection with the operation of the apparatus may be controlled through a suitable operating circuit through the control devices which will now be described.

As seen in FIG. 1, a control panel on the front component section 12 of the case includes a motor switch 120, which is an on-off switch for the feed motor 36, and associated function switches which are an erase switch 121, a playback switch 122, and a record switch 123. The switches 121, 122 and 123 are provided to condition the apparatus to perform the appropriate functions when the motor switch 120 is actuated. With reference to the recorder head 30 and its associated magnets D, E, F and G, for example, actuation of the erase switch 121 to the on position would energize the erase magnets D and G and de-energize the record and playback magnets E and F. Closing of the motor switch 120 then would operate the machine to merely erase recorded information on the web 6.

The closing of the playback switch 122 would de-energize the erase magnets D and G, and would condition the playback magnets E and F to be alternately energized in response to the respective directions of head traversal and to feed the detected information to the amplifying and sound producing components. Reopening of the record switch 123 would condition the magnet pairs D, F and E, G to be alternately energized in response to the directions of head traversal to erase pre-existing information on the web just prior to recording the new information.

Other controls on the panel 12 include a feed selector 124 for selecting the rate of head traverse in relation to the desired fidelity of recording or playback. The playback volume and tone may be adjusted by controls 125 and 126, and the indicator 127 may be a magic eye type indicator for indicating the input level during recording.

Referring to the rear panel over the case section 14, a counter 128 may be provided to count and/or indicate the recorded tracks on the web 6. A motor switch 130 is an on-off switch for the motors 77 and 99 for driving the feed and take-up spools 17 and 18 respectively for effecting the rewind or rapid advance operations; and the apparatus is conditioned for the operations through the associated rewind switch 131 and advance switch 132. For the rapid advance operation, for example, the closing of the rapid advance switch 132 will act to energize the above-discussed electromagnets 94, 105, 111 and 117 to disengage the pressure rollers 123 and 124, the loop roller 125, and the take-up roller 81 from the web 6 to permit unimpeded rapid advance of the web across the table area. The closing of this switch also serves to effect engagement of the clutch 98 and to connect the drive motor 77 to the motor switch 130 so that when the motor switch is closed, the web will be taken up rapidly on the take-up spool 18. Similarly, the closing of the rewind switch 131 will also act to energize the electromagnets 94, 105, 111 and 117 for the purpose described, and will connect the rewind drive motor 99 with the motor switch 130, so that when the motor switch is closed the rewind operation will be effected.

OPERATION OF THE RECIPROCATING HEAD EMBODIMENT

The operation of the traversing head embodiment will now be described, employing a recorder head 30 having four magnets D, E, F and G, as illustrated in FIGS. 8 and 8A.

The web 16 is strung between the feed spool 17 and the take-up spool 18, as illustrated diagrammatically in FIG. 3, with the web being supported on the tension rollers 19, 20 and 21, the feed roller 22, and idler roller 26. During a normal mode of operation, such as the playback, record, or erase mode, the pressure rollers 23 are urged against their respective tension rollers 19, 20 and 21 through the associated tension springs 91. The web is threaded on the drive roller 22 with the edge perforations being in appropriate relation to the drive sprockets 38; and the associated pressure roller 24 is positioned to maintain the web in driving relation with the feed roller 22. The loop roller 25 is positioned to form the desired loop in the web. The take-up roller 81 is positioned in appropriate tangential driving relation with the web roll, as wound on the take-up spool 18, and is maintained in such driving relation accommodating the increase in roll diameter through the springs 86.

Assuming the playback mode is desired, the playback switch 122 is switched to the on position. This de-energizes the recorder head erase magnets D and G and conditions the control circuit to alternately energize the playback magnets E and F and to connect these magnets with the amplifying and sound reproducing components. The motor switch 120 is now closed to operate the motor 36 which drives the incremental advance rotors 40 and 41 and the head traversal drive wheel 51. The rotors and drive wheel are coupled in timed relation so that following each traversal of the head 30 to read two adjacent tracks, the web is advanced on an incremental distance corresponding to the width of two adjacent tracks whereby the head will read the next two adjacent tracks on a succeeding double traversal of the web. The alternate closing of switches 73 and 74 by the semicircular cams 75 and 76 on the drive wheel 51 alternately energizes the electromagnets 71 and 72, thereby shifting a reversing bracket 66 to effect the traversals of the recorder head carriage 31 back and forth across the web. The switching of the playback magnets E and F of the recorder head 30 may also be effected by the switches 73 and 74 to couple the appropriate electromagnet to the sound reproducing components.

The web is incrementally advanced through intermittent engagement of the rotor gear segments 42 and 43 with the respective sprocket 38 of the feed roller 22. These incremental advances being timed to occur as the recorder head is changing direction. To obviate damage to the web during the incremental advance, the pressure rollers are momentarily lifted from their contiguous relation with the associated tension rollers through energization of the electromagnet 94, these magnets being energized through the switch 44 actuated by the passage of the gear segment 43. The switch 44 may also be employed to momentarily de-energize the playback magnets E and F to eliminate noise during the web advance operation.

During this operation of the apparatus in a normal mode, the web is wound on the take-up spool 18 through the take-up roller 81. The drive motor 77 for the take-up roller is energized through the motor switch 120, along with the motor 36. The web take-up through the drive roller 81 is continuous and the rate is adjusted to correspond to the average rate of web feed through the incremental advance feed roller 22. To maintain desired tension on the web ahead of the take-up spool 18 and to compensate for the differences between the incremental advance an the continuous rate take-up, a safety loop is maintained by the roller 25. To maintain the desired loop depth, limit switches may be provided to be actuated at the desired limits of rotor arm oscillation to shut off the apparatus in the event that the safety loop becomes either too small or too large.

For the rewind or rapid advance operation, the appropriate rewind switch 131 or rapid advance switch 132 is closed. These switches condition the apparatus for the appropriate function by connecting the respective drive motor with the motor switch 130. Additionally, both of these switches act to condition the web for rapid movement by energizing the electromagnets 24 to raise the pressure rollers 23, the electromagnets 105 to swing the pressure roller 24 out of engagement with the associated feed roller 22, the electromagnets 111 to swing the loop roller 25 out of engagement with the web, and the electromagnets 117 to swing the take-up drive roller 81 out of engagement with the web roll on the take-up spool 18. When the motor switch 130 is then closed, the web is driven rapidly to accomplish the selected rewind or rapid advance function.

DESCRIPTION OF ROTATING HEAD EMBODIMENT

A modified form of apparatus including rotating heads for recording or reading transverse tracks of an intermittently moving web as illustrated in FIGS. 23 through 30 of the drawing. In this modified form of the apparatus, many of the components are identical to those described with respect to the reciprocating head embodiment; and where necessary to refer to these components in the following description they will be identified by the same reference numbers as in the above-described embodiment. Similarly, the case and controls are identical to those already described and will be referred to by the same reference numbers.

Figure 24:
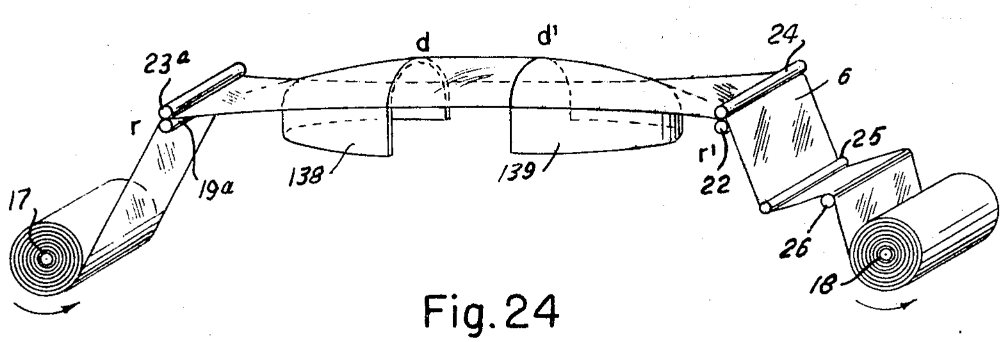
FIG. 24 is a diagrammatic illustration of the path of the web through the apparatus of FIG. 23.

Referring to the diagrammatic illustration of FIG. 24, when a web 6 is loaded in the apparatus, it is connected between the feed spool 17 and the take-up spool 18. A table area is defined between a tension roller 19*a* and associated pressure roller 23*a* which are rotatably supported adjacent to the feed spool 17, and an incremental feed assembly as previously described including a drive roller 22 and associated pressure roller 24. On the take-up spool side of the feed roller 22, a safety loop is formed between the feed roller 22 and an idler roller 26 by means of a loop forming mechanism as previously described including the loop roller 25.

Figure 25:
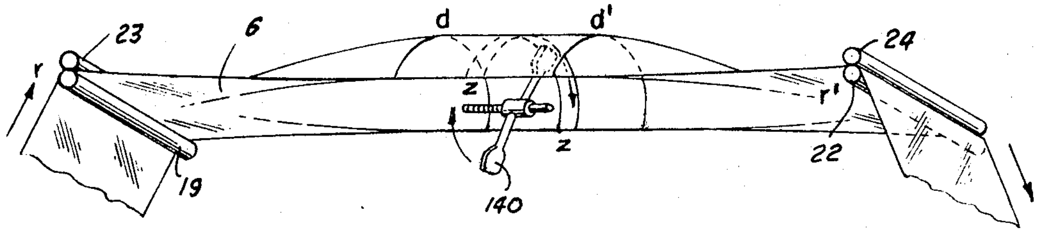
FIG. 25 is a diagrammatic illustration of the relation between the web and the head carrying rotor.

Within the table area, the web 6 is formed to assume a semicylindrical hood configuration in a record-playback area, indicated as the area $d$–$d^1$ in FIGS. 24 and 25. The semicylindrical hood is formed about an axis lying parallel to the direction of movement of the web, to shape the web to be swept by rotating magnetic heads which rotate about the same axis to define transverse tracks 7 on the web as illustrated in FIG. 4.

As seen in the drawings, forming plates 138 and 139 are mounted on the case 10 in confronting relation along the path of movement of the web. The forming plate 138 is positioned on the feed spool side of the record-playback area and serves, during the normal operation of the apparatus, to change the web configuration from the flat form emerging from the tension roller 19*a* to the cylindrical form passing the record-playback area. Similarly the forming plate 139, which is positioned on the take-up spool side of the recording area serves to change the form of the web from the cylindrical form back to the flat form accommodated by the feed assembly 22, 24.

The web must, of course, assume a cylindrical form in the record-playback area $d$–$d^1$ for the purpose of accommodating the rotating head; and in the illustrated form, the angular extent of the cylindrical hood is 180°, exclusive of the web margins. It will be understood that the angular extent of the cylindrical hood may be less than 180° if desired.

Figure 26:
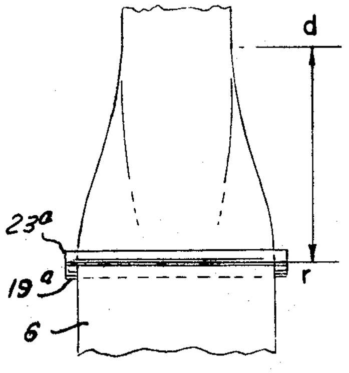
FIG. 26 is a diagram illustrating dimensional relationships for forming a cylindrical web portion.

In order to assure a smooth and uniform cylindrical hood in the record-playback area of the web, the apparatus must provide sufficient length of the web to convert from the flat form to the cylindrical form and back to the flat form. It appears that, for good results to be achieved, the conversion distance should be at least twice the diameter of a semicylindrical hood portion. This is illustrated in FIGS. 24 and 26 wherein the position of the pressure roller 19*a* is indicated at *r* and the feed roller end of the semicylindrical hood is indicated at *d*. The distance *r–d* then is the conversion distance wherein the web form is changed from flat to semicylindrical; and this distance should be at least twice that of the hood diameter. Similarly, the conversion distance $d^1$–$r^1$ (FIG. 24) where the web is again converted from the semicylindrical form to the flat form accommodated by the feed roller 22 should be twice the hood diameter.

Figure 23:
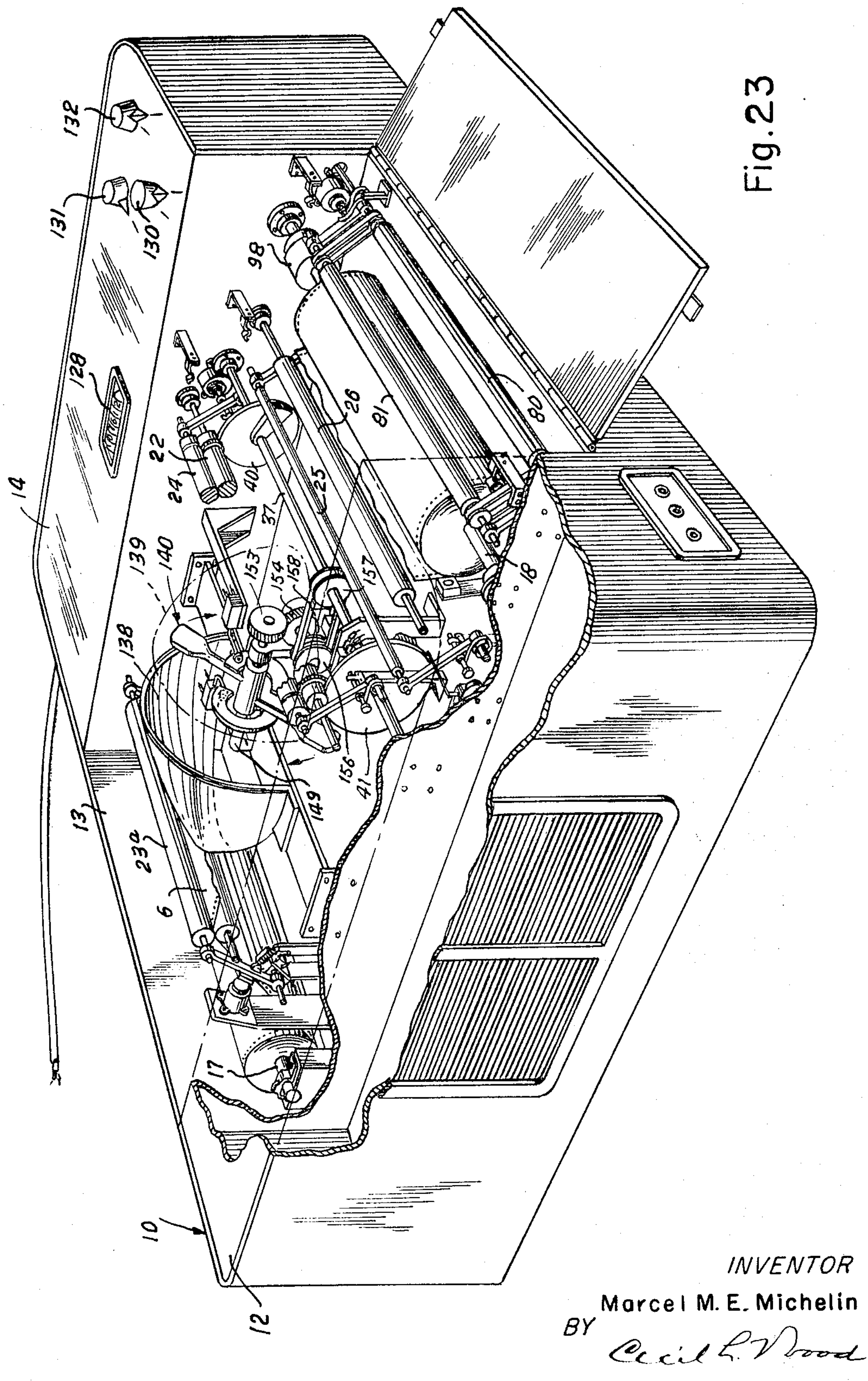
FIG. 23 is a perspective view of a modified form of apparatus according to the invention with a portion of the case removed to show the structure and arrangement of internal components.

As best seen in FIG. 23, the drive mechanism for the incremental feed of the web through the drive roller 22 is identical to that previously described and includes the main drive motor 36, the drive shaft 37, the rotor discs 40 and 41 with associated gear segments 42 and 43 for intermittent engagement with the feed roller drive sprockets 38, and the switch 44 actuated intermittently by the gear segment 43 and for each revolution of its associated rotor disc. As will be explained, after each incremental advance of the web, the recorder heads will record or read two adjacent tracks on the web which occupy approximately 6 mm. of web length. Accordingly, the incremental advance mechanism is designed to advance the web approximately 6 mm. for each advance movement.

Figures 28, 29:
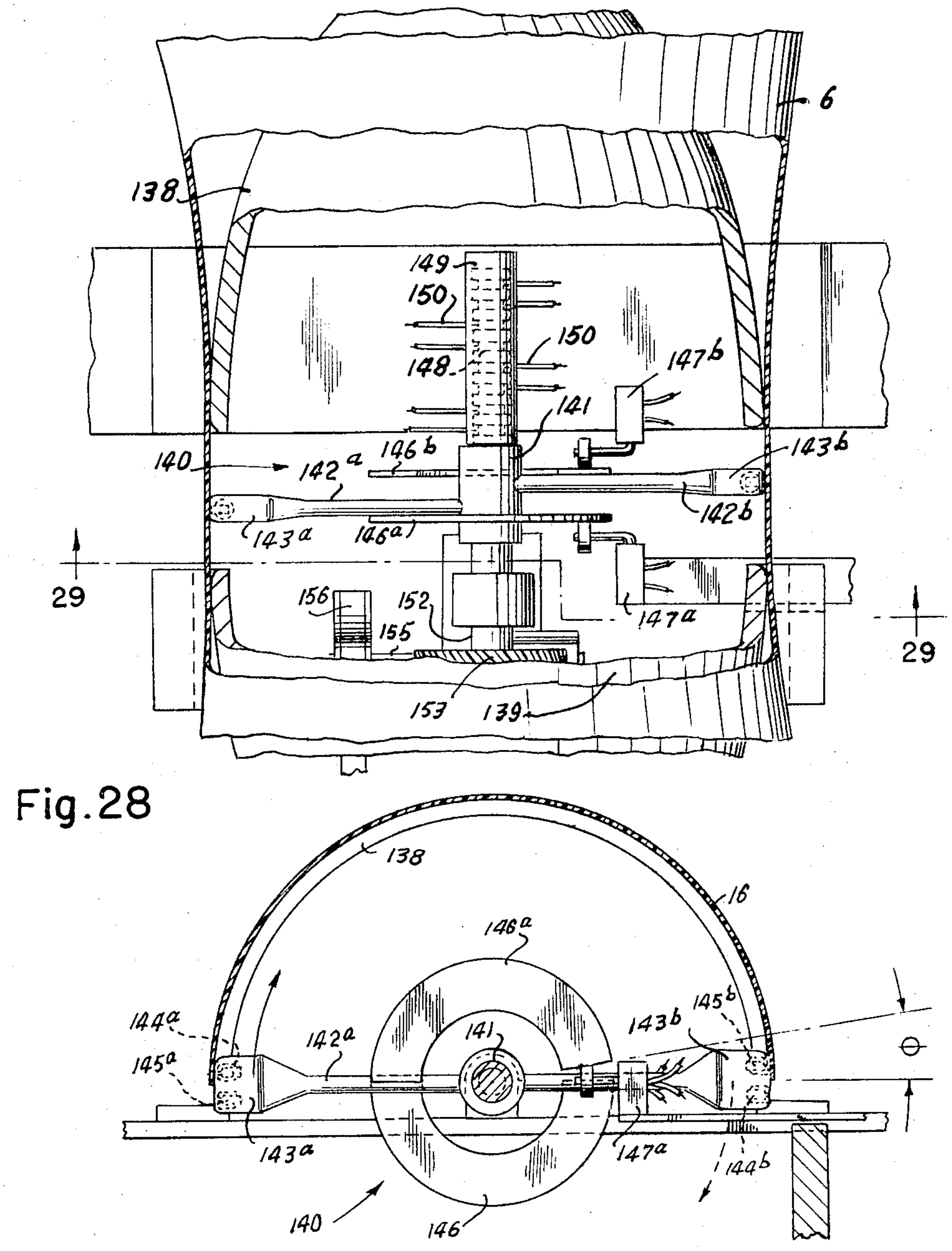
FIG. 28 is a fragmentary view taken on a horizontal plane, illustrating the operation of the head rotor in the apparatus of FIG. 23.
FIG. 29 is a fragmentary view of the rotor mechanism as viewed along the line 29—29 of FIG. 28.

The recorder heads are carried on the rotor assembly 140 which, as best seen in FIGS. 28 and 29, includes a hub 141 opposed radially extending arms 142*a* and 142*b*, heads 143*a* and 143*b* carried at the outer ends of the arms 142*a* and 142*b* respectively, and switch actuating cams 146*a* and 146*b* which coact with switches 147*a* and 147*b* respectively to control the switching of the heads as will be described. As viewed in FIG. 29, the rotor is driven in a clockwise direction; and the head 143*a* includes an erase electromagnet 144*a* and a recordplayback electromagnet 145*a* which are aligned to follow each other in the line of travel of the head with the erase magnet 144*a* positioned to be the lead magnet. Similarly, the head 143*b* includes respective leading and trailing erase and recordplayback electromagnets 144*b* and 145*b*.

Figure 27:
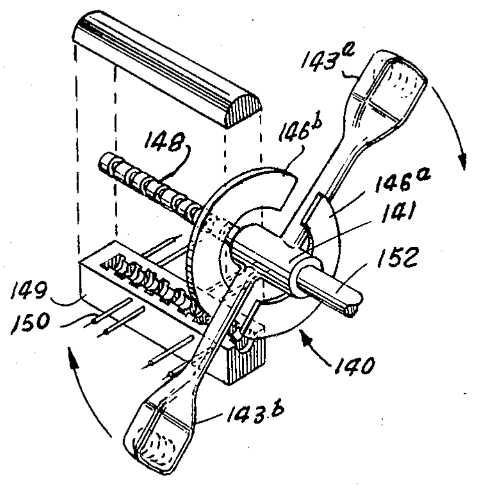
FIG. 27 is a detailed view of the head rotor.

For providing electrical connections between the four electromagnets of the rotor assembly and the control circuit for the apparatus, a jack 148 is fixed to and extends axially from the hub 141 and is provided with eight annular contact rings to accommodate four pairs of electrical connections for the four electromagnets. The jack 148 coacts with a plug 149 which may be fabricated of mating halves as indicated in FIG. 27, and which in assembled relation is nonrotatably fixed to the case 10, includes for example eight axially spaced wiper contacts for engagement with the eight contact rings of the jack 148.

The jack 148, the hub 141, the arms 142*a* and 142*b* are preferably hollow for carrying the four connecting leads from each of the recorder heads to the respective annular contact rings of the jack. External conductors 150 associated with the plug then, connect the electromagnets 144 and 145 with the control circuit of the apparatus.

As best seen in FIG. 23, the head rotor assembly 140 is rotatably supported in the case 10 on the axis of the hood portion of the web 6 as formed by the forming plates 138 and 139. The rotor hub 141 is fixed to a shaft 152 which also carries a helical gear 153. The helical gear 153 meshes with a mating helical gear 154 carried on a transverse shaft 155 which also carries a pulley 156. The shaft 155 is parallel to the main drive shaft 137, and this shaft has mounted thereon a pulley 157 aligned with the pulley 156 and driving the latter pulley through a belt 158. The head rotor 140 then is driven by the main drive shaft 137 which also drives the increment advance rotors 40 and 41; and these driven elements are timed as will be described.

As best seen in FIG. 28, the head rotor arms 142*a* and 142*b* are axially staggered so that the track recorded by the arm 143*a* is adjacent to the track recorded by the head 143*b*. As indicated above, each recorded track occupies a width on the web of approximately 3 mm., with two adjacent tracks occupying a width of 6 mm. With the described arrangement, then, for each revolution of the head rotor 140 two adjacent tracks will be recorded (or read); and following the recording of two adjacent tracks the web must be advanced 6 mm. for the recording of a subsequent two adjacent tracks.

As described in the previous embodiment, the web is advanced incrementally 6 mm. for each revolution of the rotor gear segments 42 and 43 through the drive roller 22. Accordingly the mechanical drive between the rotor discs 40 and 41 and the head rotor 140 is such that the head rotor will be driven through one revolution for each revolution of the rotor discs. Furthermore, the timing will be such that the incremental advance of the web occurs just at the beginning of the sweep of the web by the recorder head 143*a*.

During the revolution of the head rotor 140, the heads 143*a* and 143*b* are alternately positioned to sweep the undersurface of the web; and accordingly the heads are alternately switched to energize the respective electromagnets through the switches 147*a* and 147*b* actuated respectively by the switch actuators 146*a* and 146*b*. These actuators are in the form of semicircular plates disposed in parallel planes perpendicular to the axis of rotation of the head rotor; and as best seen in FIG. 28, the switches 147*a* and 147*b* are positioned to be closed during a portion of each revolution of the head rotor through engagement of switch actuator arms by the actuator plates 146.

As best seen in FIG. 29, the switch actuator rollers are positioned in a horizontal plane defined by the head rotor axis. In the illustrated embodiment, the normal leading and trailing ends of the recorded tracks on the semicircular dome of the web also lie in this horizontal plane.

To explain an operating sequence during one revolution of the head rotor 140, such a sequence begins with the head rotor positioned as shown in FIG. 29 wherein the head 143a is about to record, for example, a first track A followed by the recording of a second track B by the head 143*b*. In the position shown in FIG. 29 then the head 143*b* has just completed recording a track B, and the trailing edge of the switch actuator **146*b* is disengaging from the actuator roller of switch 147*b* to de-energize the magnets of the head 143**b.

Figure 30:
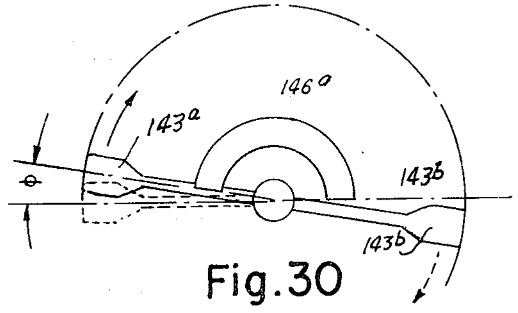
FIG. 30 is a diagrammatic view based on FIG. 29, fully illustrating the operation of the head rotor.

At this point the incremental advance mechanism will advance the web 6 mm. through the rotor discs 40 and 41; and during this incremental advance of the web the recording head **143*a* should not be energized. Accordingly, as best seen in FIG. 29, the leading edge of the switch actuator plate 146*a* has not yet engaged the roller for the switch 147*a* since the leading edge is not positioned in the above-mentioned horizontal plane. Rather, the leading edge of the actuator plate 146*a* is displaced from the horizontal plane by the angle "theta" as indicated in FIG. 9. This permits the rotor 140 to rotate through the angle theta after the head 143*b* is de-energized and before the head 143*a* is energized; and the time for this rotation of the head rotor is sufficient for the incremental advance of the web. FIG. 30 diagrammatically illustrates the position where the rotor has advanced through the angle theta from the position illustrated in FIG. 29. The leading edge of the switch actuator plate 146*a* is now positioned to actuate the switch 147*a* to energize the magnets of the head 143*a*. The track A recorded by the head 143*a*** will then begin at a point spaced from the edge of the central recording area of the web.

When the head rotor has rotated 180° from the FIG. 29 position, the head **143*a* will have completed the recording of its track and the trailing edge of the switch actuator 146*a* will disengage from its associated switch to de-energize the associated head magnets. Simultaneously the actuator plate 147*b* will engage its associated switch 147*b* to energize the magnets of the head 143*b*** to effect the recording of the track B which will be recorded through the full sweep of 180° of the head. Following the recording of the track B, the web is again advanced 6 mm. and the cycle repeats. Each of the tracks A then are shorter than the adjacent tracks B.

While in the above-described head rotor, the arms and heads are axially offset relative to the hub to operate on the adjacent web tracks A and B, it will be apparent that the arms and heads could be aligned in he same plane with the heads having a width greater than 6 mm. and with only the respective electromagnets being offset to operate on adjacent side-by-side tracks for each revolution of the rotor. As another alternative, the web dome may be formed to have an angular extent of only 120° for the central record portion of the web 16, and a three-headed rotor being provided to operate on three adjacent tracks for each revolution of the head rotor.

As mentioned above, the tension roller **19*a* and associated pressure roller 23*a*, positioned adjacent to the feed spool 17, have the same structure as the previously described tension roller 19 and associated pressure roller 23 and are mounted in the same manner. Particularly, the pressure roller 23*a* is rotatably supported on arms 90*a* and is urged into engagement with the tension roller through tension springs 91*a*. The pressure roller is disengaged from the tension roller through energization of electromagnets 94*a* acting on the arms 90*a***.

During each incremental advance of the web 16, the pressure roller **23*a* is raised from the web in the manner previously described through the energization of the electromagnet 94*a* through the momentary closing of the switch 44 by the actuating gear segment 43** of the incremental advance mechanism.

The feed assembly pressure roller 24, the loop roller 25, and the take-up roller 81 all function as in the previously described embodiment, and all are lifted from engagement with the web 6 for the rewind and rapid advance operations. For these operations, the pressure roller **23*a* is lifted simultaneously so that the web will move freely when drawn across the table area through direct drive of he feed spool 17 or the take-up spool 18** in the operation of the rotating head embodiment.

OPERATION OF THE ROTATING HEAD EMBODIMENT

To summarize the operation of the rotating head embodiment, the web 16 is strung between the feed spool 17 and the take-up spool 18, with the web being formed to define a semicylindrical dome in the record-playback area, the dome being formed by the forming plates 138 and 139. It is assumed, for purposes of this description, that the semicylindrical dome is formed from the central recording portion of the web 6, apart from the perforated edge portion, and has an angular extent of 180°.

During a normal mode of operation, such as the playback mode, the pressure rollers **23*a* and 24 are against their respective tension and feed rollers, the loop roller 25 is positioned to form the desired loop in the web, and the take-up roller 81 is positioned in appropriate driving relation with the web roll formed on the take-up spool 18**.

The controls for the rotating head embodiment are the same as those for the reciprocating head embodiment; and, for the playback mode, the playback switch 122 is closed. This de-energizes the erase magnets **144*a* and 144*b* and conditions the control circuit for connecting the record-playback magnets 145a and 145**b into the appropriate transducing and amplifying components to audibly reproduce the information through the speaker.

The motor switch 120 is then closed to energize motor 36 which drives the incremental advance mechanism and the head rotor to cause the heads to read two side-by-side tracks following each incremental advance of the web, with the heads being appropriately switched into the circuit as each head sweeps the web dome. During each incremental advance of the web, the pressure roller **23*a*** is lifted from the web to prevent damage to the web.

For rewind or rapid advance, the motor switch 120 is opened and the desired rewind switch 131 or rapid advance switch 132 are closed. These switches condition the apparatus for the chosen function, including energizing the electromagnets **94*a*, 105, 111, and 117 to disengage the respective rollers 23*a*, 24, 25, and 81 from the web. The motor switch 130 is then closed to energize the selected drive motor for rapid drive of either the feed spool 17 or the take-up spool 18**.

What has been described are two forms of apparatus for recording or playing back extremely lengthy recordings, the apparatus employing a very wide magnetic tape or web with the recorded tracks being disposed transversely across the web. The apparatus is capable of uninterrupted recording or playback of very lengthy presentations such as a book or play, and yet the apparatus is of convenient size to be readily carried from place to place.

While preferred embodiments of the invention have been illustrated and described, it will be understood by those skilled in the art that changes and modifications may be resorted to without departing from the spirit and scope of the invention.

What is claimed is:

1. Magnetic recording apparatus for use with a wide magnetic web comprising means defining a web supporting path presenting one surface of the web for engagement by a magnetic recorder head;

magnetic recorder head means having a plurality of individual magnetic means for producing a plurality of adjacent tracks on the web; support means for carrying said head means in a path transverse to the web path for engagement with the web;

drive means for driving said head support means for successive traversals of the web path; drive means for advancing the web along its path intermittently in predetermined increments; and means for synchronizing said head support drive means and said web drive means to produce an incremental advance of the web only after a selected plurality of traversals of said head means;

and means for sequentially energizing said plurality of individual magnetic means to produce the plurality of adjacent tracks on a stationary web.

2. Apparatus as set forth in claim 1 wherein said intermittent web drive means comprises a drive roller providing a cylindrical surface for supporting said web; a pressure roller providing a cylindrical surface for maintaining the web in engagement with the drive roller cylindrical surface; said drive roller including axially spaced pinion means having teeth projecting from the roller cylindrical surface for engagement with web margin perforations; and rotor drive means having axially spaced gear segments disposed for engagement with said axially spaced pinion means, whereby continuous rotation of said rotor means produces intermittent rotation of said drive roller.

3. Apparatus as set forth in claim 1 including a take-up means for taking up the web continuously at an average rate corresponding to the average feed rate for the incremental drive means; said take-up means including: a take-up spool, a drive roller disposed for driving engagement with the peripheral surface of a web roll at the take-up spool, pivoted support arms for said drive roller and spring means for urging said roller in engagement with the web roll, and drive means for said drive roller;

said take-up means being spaced from said incremental drive means to provide a self-adjustable slack loop of web therebetween; a pivoted control arm bearing on said web at said slack loop, automatically positionable in response to the amount of slack in said web; and said control arm actuating said take-up roller drive means responsive to the amount of slace in said web.

4. Apparatus as set forth in claim 1 wherein said web supporting path is defined by spaced roller pairs each comprising a support roller and a pressure roller; means for maintaining said pressure rollers into engagement with the respective support rollers during the normal speed operations of the apparatus; and means for moving said pressure rollers out of engagement with respective support rollers for the rapid advance and rewind operations of the apparatus.

5. Apparatus as set forth in claim 1 wherein said head support means includes a carriage mounted for reciprocating movement in a path transverse to the web path;

said carriage carrying a single recorder head having a plurality of individual electro-magnetic means spaced transversely of the direction of carriage movement for producing the same plurality of adjacent tracks on a stationary web;

and wherein said synchronizing means effects the incremental advance of the web following the recording of each said plurality of tracks, said incremental advance corresponding in length to the width of said plurality of tracks on the web.

6. Apparatus as set forth in claim 5 including switching means associated with said carriage drive means for energizing sequentially the individual electromagnetic means to produce successive adjacent tracks on respective successive traversals of the recorder head.

7. Apparatus as set forth in claim 1 wherein said head support means comprises a rotor including a plurality of spaced radial arms; each arm carrying a recorder head including magnetic means for producing a single track; said head magnetic means being axially spaced relative to each other for producing a plurality of adjacent tracks on a stationary web; and wherein said synchronizing means effects incremental advance of the web following each revolution of the rotor to produce a plurality of adjacent tracks, said incremental advance corresponding in length to the width of said plurality of tracks on the web.

8. Apparatus as set forth in claim 7 including selectively operable switch means for energizing sequentially said head magnetic means.

9. Apparatus as set forth in claim 1 wherein said head support means comprises a rotor carrying a plurality of individual magnetic means spaced axially relative to said rotor for producing the same plurality of adjacent tracks on a stationary web;

and wherein said synchronizing means effects incremental advance of the web following the recording of each said plurality of adjacent tracks, said incremental advance corresponding in length to the width of said plurality of tracks on the web.

10. Apparatus as set forth in claim 9 wherein said web supporting path means includes confronting forming plates for first changing the form of the web from a flat form to a cylindrical form and secondly changing the form of the web from a cylindrical form to a flat form, said confronting forming plates being disposed on opposite sides of the rotor for maintaining the web in the cylindrical form for engagement by the rotor carried magnetic means.

11. Apparatus as set forth in claim 10
wherein said web supporting path means includes two roller pairs each comprising a support roller and a pressure roller; said roller pairs being disposed outside of said forming plates, and each roller pair being spaced from the respective adjacent forming plate to define a conversion distance between the roller pair and the cylindrical portion of the forming plate which is at least twice the diameter of the cylindrical portion.

12. Apparatus as set forth in claim 9
including switching means associated with said rotor for energizing sequentially said plurality of individual magnetic means to produce successive adjacent tracks on the web.

13. Apparatus as set forth in claim 12
wherein said switching means includes arcuate switch actuating cams mounted for rotation with said rotor for actuating switches in timed relation for energizing said magnetic means.

14.
Magnetic recording apparatus for use with a wide magnetic web comprising
means defining a web supporting path presenting one surface of the web for engagement by a magnetic recorder head;
a magnetic recorder head having magnetic means for producing at least one track on the web; support means for carrying said head in a path transverse to the web path for engagement with the web; said head support means including a carriage mounted for reciprocating movement in a path transverse to the web path; drive means for driving said head support means for successive traversals of the web path; drive means for advancing the web along its path intermittently in predetermined increments; means for synchronizing said head support drive means and said web drive means to produce an incremental advance of the web only at an end of a head traversal;
guide track means supporting said carriage for reciprocating movement;
said carriage drive means comprising a belt coupled to said carriage and supported between spaced pulley assemblies, each pulley assembly including a driven wheel; a driving wheel driven continuously by a drive motor; and a pair of idler wheels carried on a reciprocating bracket for coupling said drive wheel alternatively to said two driven wheels to effect reversing drive of said belt and said reciprocating movement of said recorder head carriage.

15. Apparatus as set forth in claim 14
including electromagnetic means for reciprocating said idler wheel bracket;
switch means for selectively energizing said electromagnetic means; and switch actuator means mounted on said driving wheel for actuating said switch means in predetermined time relation.

16. Apparatus as set forth in claim 14
wherein said carriage carries a single recorder head having a plurality of individual electromagnetic means spaced transversely of the direction of carriage movement for producing the same plurality of adjacent tracks on a stationary web; switch means for sequentially energizing said plurality of individual electromagnetic means to produce the plurality of adjacent tracks on a stationary web; and switch actuator means mounted on said driving wheel for actuating said switch means in predetermined sequential relation.

* * * * *